United States Patent
Heiderman et al.

(10) Patent No.: US 10,564,656 B2
(45) Date of Patent: Feb. 18, 2020

(54) GAS DELIVERY VALVE AND METHODS OF USE THEREOF

(71) Applicants: Douglas C Heiderman, Akron, NY (US); Ashwini K Sinha, East Amherst, NY (US); Michael McBearty, Washington, PA (US); John Piscitelli, Washington, PA (US)

(72) Inventors: Douglas C Heiderman, Akron, NY (US); Ashwini K Sinha, East Amherst, NY (US); Michael McBearty, Washington, PA (US); John Piscitelli, Washington, PA (US)

(73) Assignees: Praxair Technology, Inc., Danbury, CT (US); Sherwood Valve, LLC, Washington, PA (US)

( * ) Notice: Subject to any disclaimer, the term of this patent is extended or adjusted under 35 U.S.C. 154(b) by 125 days.

(21) Appl. No.: 15/838,492

(22) Filed: Dec. 12, 2017

(65) Prior Publication Data
US 2018/0239375 A1    Aug. 23, 2018

Related U.S. Application Data

(60) Provisional application No. 62/433,559, filed on Dec. 13, 2016.

(51) Int. Cl.
| | | |
|---|---|---|
| *G05D 16/02* | (2006.01) | |
| *F16K 17/30* | (2006.01) | |
| *G05D 16/06* | (2006.01) | |

(52) U.S. Cl.
CPC ............. *G05D 16/02* (2013.01); *F16K 17/30* (2013.01); *G05D 16/065* (2013.01); *F17C 2205/0338* (2013.01); *Y10T 137/7811* (2015.04); *Y10T 137/88046* (2015.04)

(58) Field of Classification Search
CPC ..... Y10T 137/88046; F17C 2205/0332; F17C 2205/0338; G05D 16/02; G05D 16/065; F16K 17/30
USPC ........................................ 137/505.28, 614.19
See application file for complete search history.

(56) References Cited

U.S. PATENT DOCUMENTS

| | | | |
|---|---|---|---|
| 4,986,298 A | * | 1/1991 | Martin ................ A61M 1/0031 137/15.22 |
| 5,089,027 A | | 2/1992 | Rossoll et al. |
| 5,101,816 A | | 4/1992 | Wilcox |

(Continued)

FOREIGN PATENT DOCUMENTS

| | | |
|---|---|---|
| WO | 2005040668 A2 | 5/2005 |
| WO | 2013076263 A1 | 5/2013 |

*Primary Examiner* — William M McCalister
(74) *Attorney, Agent, or Firm* — Nilay S. Dalal (57) ABSTRACT

A novel and improved inventive valve with a regulating function is provided that is capable of filling to higher fill pressures than previously attainable with conventional C-10 "on-off" valves. The valve contains a single flow passageway by which gas dispenses and enters the valve. A fill adapter is specially configured to engage the valve to allow filling at the higher pressures along the single flow passageway. The structure of the valve allows greater utilization of cylinder capacity; simplifies filling and dispensing with the single flow passageway; and allows for regulating gas pressure during delivery without increasing the overall size of the cylinder package.

20 Claims, 7 Drawing Sheets

(56) References Cited

U.S. PATENT DOCUMENTS

| | | | | |
|---|---|---|---|---|
| 5,303,734 | A | * | 4/1994 | Eidsmore ............ G05D 16/0616 137/505.43 |
| 5,665,894 | A | * | 9/1997 | Baker ................ G01N 33/0006 73/1.05 |
| 5,996,625 | A | * | 12/1999 | Collado ................ G05D 16/10 137/614.19 |
| 7,080,655 | B2 | * | 7/2006 | Jacksier ............... G05D 16/103 137/14 |
| 8,171,950 | B2 | * | 5/2012 | Colby .................... F16K 1/307 137/15.01 |
| 8,991,378 | B2 | * | 3/2015 | Newman ................ F41B 11/72 124/71 |
| 10,248,140 | B2 | * | 4/2019 | Chen .................... G05D 16/166 |
| 2005/0103383 | A1 | * | 5/2005 | Carroll ................. G06Q 10/10 137/505.28 |
| 2009/0078321 | A1 | * | 3/2009 | Arnott .................... F17C 13/00 137/14 |
| 2009/0133760 | A1 | * | 5/2009 | Tai ........................ F16K 1/307 137/505.46 |
| 2010/0175763 | A1 | | 7/2010 | Newman et al. |
| 2012/0090705 | A1 | * | 4/2012 | Newman ................ F16K 1/305 137/535 |
| 2012/0204976 | A1 | * | 8/2012 | Newman ............... F41B 11/723 137/505.42 |
| 2015/0013776 | A1 | | 1/2015 | Lammers |
| 2015/0355645 | A1 | * | 12/2015 | Marangwanda ........ F16K 17/30 137/505.11 |

* cited by examiner

FIG. 1

Closed

GAS DELIVERY VALVE AND METHODS OF USE THEREOF

CROSS REFERENCE TO RELATED APPLICATION(S)

This application claims the benefit of provisional application Ser. No. 62/433,559, filed Dec. 13, 2016 and titled GAS DELIVERY VALVE AND METHODS OF USE THEREOF.

FIELD OF INVENTION

The present invention relates to a unique valve apparatus for cylinders to fill and dispense gases from a single port that is self-regulating upon withdrawal of the gas from the gas cylinder.

BACKGROUND OF THE INVENTION

Gas analyzers are typically used in a variety of applications to measure the quality of air at a plant site, such as by way of example, a petrochemical plant or a coal plant. These gas analyzers are used to detect the presence of trace amounts of pollutants or impurity gases. By way of example, industrial hygiene and EPA emission applications commonly require measuring air quality with the use of gas analyzers.

The gas analyzers periodically require the use of calibration gases as an integrity check to ensure the analyzers are properly functioning. The calibration gases contain precise amounts of the gases to be detected (e.g., hydrogen sulfide, carbon monoxide and combustibles) by the gas analyzer, and as such are generally used to verify whether the gas analyzers are calibrated and functioning properly. The calibration gases are commonly provided as a compressed gas in high pressure cylinders (e.g., 500-1000 psig). The gas compressed cylinders can contain precise amounts of calibration gases such as, by way of example, hydrogen sulfide (H2S), carbon monoxide (CO) or combustibles. The calibration gases are generally used for the calibration and/or "bump" checking of portable and fixed air/gas monitors. The term "bump" test or check is a method that generally involves delivering a calibrated gas mixture to gas monitoring equipment to verify the response of the gas monitoring equipment. The response can occur by any suitable means including an audible response or a visible response. Additionally, portable user-worn gas monitors generally employ a vibratory alarm response. The monitors can be used to measure percent oxygen; % lower explosive limit (LEL); and parts per million concentrations of hydrogen sulfide, ammonia, and other gases.

The compressed gas cylinders which contain the calibration gases are typically required to be relatively small in size, lightweight and portable to be conducive for usage at various locations on a plant site. In order to achieve these attributes, the compressed gas cylinders typically have a water volume of 0.5 to 1.5 L; formed from aluminum; and in most cases are disposable. Disposable cylinders are non-refillable, thereby requiring disposal of the cylinder as hazardous waste. Typically, the customer is responsible for handling the disposal of the cylinder.

The compressed gas cylinder typically has a valve for filling, containing the pressurized gas in the cylinder, and releasing the pressurized gas from the cylinder. The outlet of this valve has a standard thread. One example is a ⅝"-18 UNF-2B thread commonly referred to as a "C-10 valve". A standard C-10 valve has a single cylinder connection point which mates with the C-10 valve to the cylinder. This connection is typically a straight thread (e.g. ¾"-16-UNF 2A) and makes a seal to the cylinder via an o-ring. C-10 valves have been widely used in the field strictly as an on-off valve for the delivery of gases from compressed gas cylinders. In the closed position, the C-10 valve prevents flow of gas from the cylinder, and in the open position, the C-10 valve moves to the open position to allow the gas to dispense from the cylinder. The gas is delivered at cylinder pressure.

Because the C-10 valve does not regulate pressure, but rather solely functions as an on-off valve, a pressure regulator is required to down regulate the pressure from the cylinder pressure to the delivery pressure required by the end user (e.g., analyzer), which is generally 30-35 psig. The pressure regulator is connected to the C-10 valve; the pressure regulator has a complimentary thread of ⅝"-18 UNF-2A on its inlet so it can be threaded onto the C-10 valve outlet. The connection from the gas analyzer to the compressed gas cylinder via the C-10 valve, which is connected to the pressure regulator, has become the standard in the industry today.

Today, the pressure regulators in the field that are used for these gas analyzer calibration applications are rated for a maximum inlet pressure of no more than 500-1000 psig. Consequently, although the C-10 valve is capable of handling a higher pressure and the cylinder is capable of handling a maximum fill pressure of 1800-2000 psig, the fill pressure is limited to the maximum inlet of the pressure regulator of no more than 500-1000 psig to avoid over pressurizing the pressure regulator. Because the cylinder package contents are limited by this pressure, only 25-50% of the cylinder capacity is being utilized. This underutilization of the cylinder volume capacity results in more frequent cylinder replacement; additional ordering and inventory requirements for both the supplier and the customer, and in the case of disposable cylinders, the creation of more disposable waste, which must be handled by the customer. The overall result is a potentially significant increase in wasted resources.

One alternative for a method of increasing the fill pressure in the cylinder and maintaining the rated outlet pressure of the C-10 valve is to replace the historically used pressure regulators that require no more than 500-1000 psig with a pressure regulating device that can receive cylinder pressure from the C-10 valve and then step down the cylinder pressure to the desired use pressure (e.g., 30-35 psig for a gas analyzer). This enables the users to fill the cylinders to a higher pressure and regulate the delivery pressure to a desired value as needed by the end user. Unfortunately, these external pressure regulating devices are bulky and add dimensional limitations to the use of C-10 valve cylinder package (i.e., compressed gas cylinder containing calibration gas and C-10 valve), which is required to be small in size, lightweight and portable for onsite usage at various locations in a plant. As such, the external regulating device may not be suitably compatible with the C-10 valve cylinder package.

Figure 1:
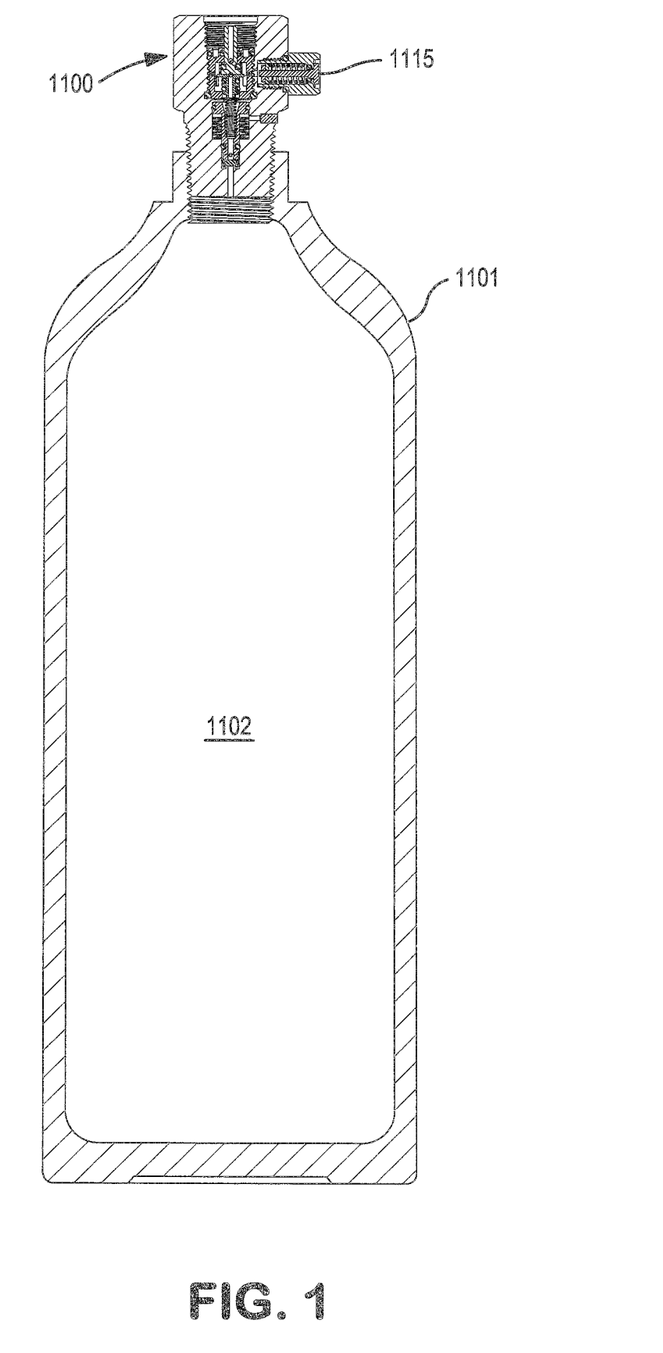
FIG. 1 shows a valve in accordance with the principles of the present invention affixed to a top portion of a cylinder.
Figure 2A:
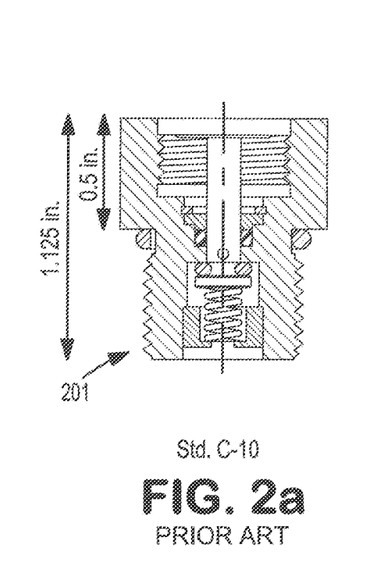
FIGS. 2a, 2b, and 2c shows a comparison of exposed height for valve bodies of a standard C-10 valve, modified C-10 valve and the C-10 valve of the present invention, respectively.
Figure 2B:
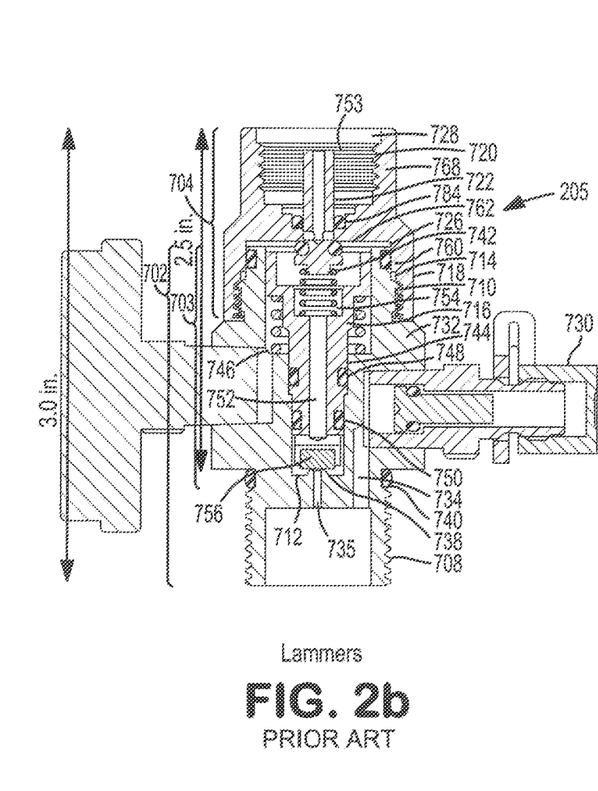

An alternative C-10 valve has been proposed by Lammers (US Patent Publication No. 2015/0013776 A1), who has attempted to integrate the regulating function within the C-10 valve. A representative schematic of the Lammers valve is shown in FIG. 2b. Lammers describes a regulating C-10 valve 205 containing a regulating function, whereby the gas pressure from the cylinder is reduced to approximately 900 psig along with the same on-off functions of the standard C-10 valve 201 shown in FIG. 2a. However, Lammers suffers from limitations. In particular, FIG. 2b shows that the regulating C-10 valve 205 requires the use of an external separate fill port 730 to bypass the regulator 702 during the cylinder filling process. The additional fill port 730 adds complexity, cost and another potential gas leak path to the regulating C-10 valve 205. The regulating C-10 valve 205 of Lammers significantly increases the exposed height of the C-10 valve body above the threaded region that threads into the top of the cylinder. Specifically, while a standard C-10 valve 201 (FIG. 201) has an exposed height of 0.5 inches above the threads, the regulating C-10 valve 205 of Lammers has an exposed height of 2.5 inches above the threaded region that threads into the top of the cylinder. The result is a bulky regulating C-10 valve 205 and cylinder package that can be too large to use for certain applications having space-constrained areas, such as, by way of example, industrial hygiene and EPA emission applications. This may provide dimensional limitations during the use of this device.

Further, the regulating C-10 valve 205 of Lammers is also deficient as it requires a separate fill port 730 in addition to the use port 753. The separate fill port 730 necessitates special equipment for modified drying, evacuation and filling of the cylinder, all of which are required steps when preparing cylinder packages. The special processing equipment requires implementing specialized fittings and connections to be installed on the cylinder during drying, evacuating and filling. Subsequently, the equipment, fitting and connections must be removed upon completion of drying, evacuating and filling. These additional steps undesirably increase time and complexity of preparing the cylinder packages.

Other methods for down regulating a pressure do not involve a C-10 connection but rather a regulator or series of regulators located inside the cylinder, as disclosed in U.S. Pat. Nos. 6,089,027 and 6,101,816. However, such a design suffers from the same drawbacks as the modified C-10 valve of Lammers, namely the need for a separate fill port for filling the cylinder.

In view of these drawbacks, there is an unmet need for an improved C-10 valve that allows greater utilization of cylinder capacity; simplifies filling and dispensing; and allows for regulating gas pressure during delivery without increasing the overall size of the cylinder package.

SUMMARY OF THE INVENTION

The invention relates, in part, to a modified and improved C-10 valve that, unlike conventional C-10 valves, incorporates a regulating feature in which a single gas flow path is used to fill and dispense from the cylinder without significantly increasing the size of the exposed valve body.

The invention may include any of the following aspects in various combinations and may also include any other aspect described below in the written description or in the attached figures.

In a first aspect, a self-closing valve with a built-in regulator function and a single flow gas path, comprising: a valve body (9) substantially disposed within a top portion of a gas cylinder (1101); the valve body (9) comprising a plunger (1) having a first end (98) and second end (99), said plunger (1) located in a retainer housing (8), said retainer housing comprising a first portion (6) and a second portion (7), said plunger (1) movable between a first position, a second position and a third position within the retainer housing, said plunger (1) comprising a first passageway (67) extending from the first end (98) of the plunger (1) and a second passageway (68) spaced apart from the first passageway (67) and extending towards the second end (99) of the plunger (1); a spring (16) operably connected to the second end (99) of the plunger (1), said spring (16) extending from the second end (99) of the plunger (1) into a bore (34) of a piston (11), said spring (16) configured to exert a force against the second end (99) of the plunger (1); the piston (11) comprising a piston first end and a piston second end, said piston first end operably connected to the second end (99) of the plunger (1), said piston second end comprising a stem (13) and a seat (12) operably attached to the stem (13); an expandable diaphragm (15) within the valve body (9) and partially surrounding the piston (11), said expandable diaphragm (15) configured to exert a force against the first end of piston (11), and said expandable diaphragm (15) further configured to regulate a pressure drop from cylinder pressure to a regulated pressure as gas (1102) is dispensed from the cylinder (1101) along the single gas flow path, but not regulate the pressure drop during gas filling along the single gas flow path; the single gas flow path configured for gas filling into the cylinder (1101) and gas dispensing from the cylinder (1101); said single gas flow path for the gas filling created, at least in part, by said plunger (1) configured in the third position, said third position characterized as said plunger (1) spaced apart from a sealing surface (82) to allow the gas to enter therebetween from the first passageway (67) of the plunger (1) and thereafter into the second passageway (68) of the plunger (1), through the bore (34) and towards the stem (13) of said piston (11), said third position of the plunger (1) further characterized as said seat (12) of the piston (11) spaced apart from a sealing surface (80) to create a first orifice (83) through which the gas from the stem (13) passes into, and further wherein said first end of the piston (11) and the second portion (7) of the retainer housing (8) are spaced apart by a first gap (85)—during the gas filling; and said single gas flow path for the gas dispensing created, at least in part, by said plunger (1) configured into the second position, said second position characterized as said plunger (1) spaced apart from the sealing surface (82) to allow said gas to exit therethrough and into first passageway (67) of the plunger (1), said second position of the plunger (1) further characterized as said seat (12) of the piston (11) spaced apart from the sealing surface (80) to create a second orifice (84) through which gas from the cylinder passes to undergo the regulated pressure drop from cylinder pressure to a regulated pressure and thereafter said gas at said regulated pressure travels into the stem (13) and bore (34) of said piston (11), and thereafter into said second passageway (68) and said first passageway (67) of the plunger (1), said single gas flow path during dispensing further defined to have said first end of the piston (11) and the second portion (7) of the retainer housing (8) spaced apart by a second gap (86) during the gas dispensing, said second gap (86) greater than the first gap (85).

In a second aspect, a self-closing valve with a built-in regulator function and a single flow gas path, comprising a valve body (9) substantially disposed within a top portion of a gas cylinder; the valve body (9) comprising a plunger (1) having a first end (98) and second end (99), said plunger (1) located in a retainer housing (8), said retainer housing (8) comprising a first portion (6) and a second portion (7) in the valve body (9), said plunger (1) comprising a first passageway (67) extending from the first end (98) and a second passageway (68) spaced apart from the first passageway (67) and extending towards the second end (99) of the plunger (1); a spring (16) operably connected to the second end (99) of the plunger (1), said spring (16) extending from the second end (99) of the plunger (1) into a bore (34) of a piston (11), said spring (16) configured to exert a force against the second end (99) of the plunger (1); the piston (11) comprising a piston first end and a piston second end, said piston first end operably connected to the second end (99) of the plunger (1), said piston second end (99) comprising a stem (13) and a seat (12) operably attached thereto; an expandable diaphragm (15) within the valve body (9) and partially surrounding the piston (11), said expandable diaphragm (15) configured to exert a force against the piston first end; said plunger (1) movable between a first position, a second position and a third position within the retainer housing (8); the plunger (1) movable into a first position and engaged with the piston (11) in response to disengagement of a fill adapter (600) or pressure regulator from the first end (98) of the plunger (1) to create a third gap (87) between the second portion (7) and the first end of the piston (11), said plunger (1) in contact with a sealed surface (82), and said gas occupying a volume created by said third gap (87) so as to force the seat (12) into contact with sealing surface (80), thereby blocking said single flow gas path at the sealed surfaces (80) and (82); the plunger (1) movable into a second position that is spaced apart from the sealing surface (82), said plunger (1) engaged with the piston (11) in response to engagement of a fill adapter (600) onto the first end (98) of the plunger (1) to create a second gap (86) between the second portion (7) of the retainer housing (8) and the first end of the piston (11) such that gas occupies a volume created by said second gap (86), said gas exerting a force that is balanced with the expandable diaphragm (15) in a configuration to create a second orifice (84) through which gas from the cylinder passes and can be dispensed along said single flow gas path; the plunger (1) movable into a third position that is spaced apart from the sealing surface (82), said plunger (1) engaged with the piston (11) in response to engagement of a pressure regulator onto the first end (98) of the plunger (1) to create a first gap (85) between the second portion (7) of the retainer housing (8) and the first end of the piston (11) such that said gas occupies a volume created by said first gap (85) that is smaller than said second gap (86) and said third gap (87), wherein said spring (16) and expandable diaphragm (15) overcomes the force exerted by said gas to cause said second end (99) of plunger (1) to be in close proximity to said first end of said piston (11) that is sufficient to prevent entry of additional gas into said first gap (85), thereby bypassing said regulating function of said expandable diaphragm (15) to allow said filling of gas into cylinder.

In a third aspect, a self-closing valve with a built-in regulator function and a single flow gas path, comprising: a valve body (9) substantially disposed within a top portion of a gas cylinder; the valve body (9) comprising a plunger (1) having a first end (98) and second end (99), said plunger (1) movable between a first position, a second position and a third position within the retainer housing, a piston (11) comprising a piston first end and a piston second end, said piston first end operably connected to the second end (99) of the plunger (1), said piston second end comprising a stem (13) and a seat (12) operably attached to the stem (13); an expandable diaphragm (15) within the valve body (9) and partially surrounding the piston (11), said expandable diaphragm (15) configured to exert a force against the piston first end, and said expandable diaphragm (15) further configured to regulate a pressure drop from cylinder pressure to a regulated pressure as gas is dispensed from the cylinder along the single gas flow path, but not regulate the pressure drop during gas filling along the single gas flow path; and a single gas flow path configured for gas filling into the cylinder and gas dispensing from the cylinder, said single gas flow path extending, at least in part, from a portion of the plunger (1) to the piston (11) and along an orifice (83) created between said seat (12) and a sealing surface (80).

In a fourth aspect, a self-closing valve operably connected to a cylinder, comprising a built-in regulator function configured to regulate gas pressure during delivery along a single gas flow path extending along the valve; and the single flow gas path configured to dispense gas from the cylinder and receive gas into the cylinder.

In a fifth aspect, a self-closing valve with a built-in regulator function and a single flow gas path, comprising: a valve body (9) comprising a plunger (1) having a first end (98) and second end (99), said plunger (1) located in a retainer housing (8), said retainer housing comprising a first portion (6) and a second portion (7), said plunger (1) movable between a first position, a second position and a third position within the retainer housing; a spring (16) operably connected to the second end (99) of the plunger (1), said spring (16) extending from the second end (99) of the plunger (1) into a bore (34) of a piston (11), said spring (16) configured to exert a force against the second end (99) of the plunger (1); the piston (11) comprising a piston first end and a piston second end, said piston first end operably connected to the second end (99) of the plunger (1), said piston second end comprising a stem (13) and a seat (12) operably attached to the stem (13); an expandable diaphragm (15) within the valve body (9) and partially surrounding the piston (11), said expandable diaphragm (15) configured to exert a force against the first end of piston (11), and said expandable diaphragm (15) further configured to regulate a pressure drop from cylinder pressure to a regulated pressure as gas (1102) is dispensed from the cylinder (1101) along the single gas flow path, but not regulate the pressure drop during gas filling along the single gas flow path; the single gas flow path configured for gas filling into the valve and gas dispensing from the valve.

BRIEF DESCRIPTION OF THE DRAWINGS

The objectives and advantages of the invention will be better understood from the following detailed description of the preferred embodiments thereof in connection with the accompanying figures wherein like numbers denote same features throughout and wherein.

DETAILED DESCRIPTION OF THE INVENTION

The relationship and functioning of the various elements of this invention are better understood by the following detailed description. The detailed description contemplates the features, aspects and embodiments in various permutations and combinations, as being within the scope of the disclosure. The disclosure may therefore be specified as comprising, consisting or consisting essentially of, any of such combinations and permutations of these specific features, aspects, and embodiments, or a selected one or ones thereof.

It should also be understood that the drawings are not drawn to scale, and in certain instances, details in the drawings have been omitted which are not necessary for an understanding of the embodiments, such as conventional details of fabrication and assembly. The drawings provided herein are intended to illustrate the principles by which the present invention can be carried out.

While the "first position" of plunger 1 is illustrated in the embodiments to be the upmost or top position; the "second position" of plunger 1 is illustrated to be the middle position; and the "third position" of plunger 1 is illustrated to be the bottommost or bottom position, it should be understood that "first position", "second position" and "third position" are not limited to such configurations. For example, if the cylinder package with the inventive C-10 valve to be discussed herein is inverted, then the "first position" would be the bottom position; the "second position" remains the middle position; and the "third position" is the top position.

Referring to FIGS. 1, 3, 4 and 5 the present invention in one aspect is directed to a modified and improved C-10 valve 1100, whereby a regulating feature is integrated into the valve body 9 (as will be discussed herein conjunction with the figures), and a single gas flow path is used for both filling gas 1102 into cylinder 1101 and dispensing gas 1102 from cylinder 1101 to which the valve 1100 is preferably threadably connected. As will be described in greater detail with respect to FIGS. 2-7, the inventive C-10 valve 1100 includes a plunger 1 that has three distinct positions that allow for filling, dispensing and flow isolation through a single gas flow path. As will also be described, during filling, a fill adapter 600 (FIG. 6) is specially configured over the plunger 1 and pressure relief valve 1115 to enable gas 1102 to fill into cylinder 1101 along the single gas flow path without prematurely releasing gas 1102 through the pressure relief valve 1115, thereby increasing the fill capacity of the cylinder 1101 and allowing the cylinder 1101 to fill to a maximum pressure of the cylinder 1101.

Figure 3:
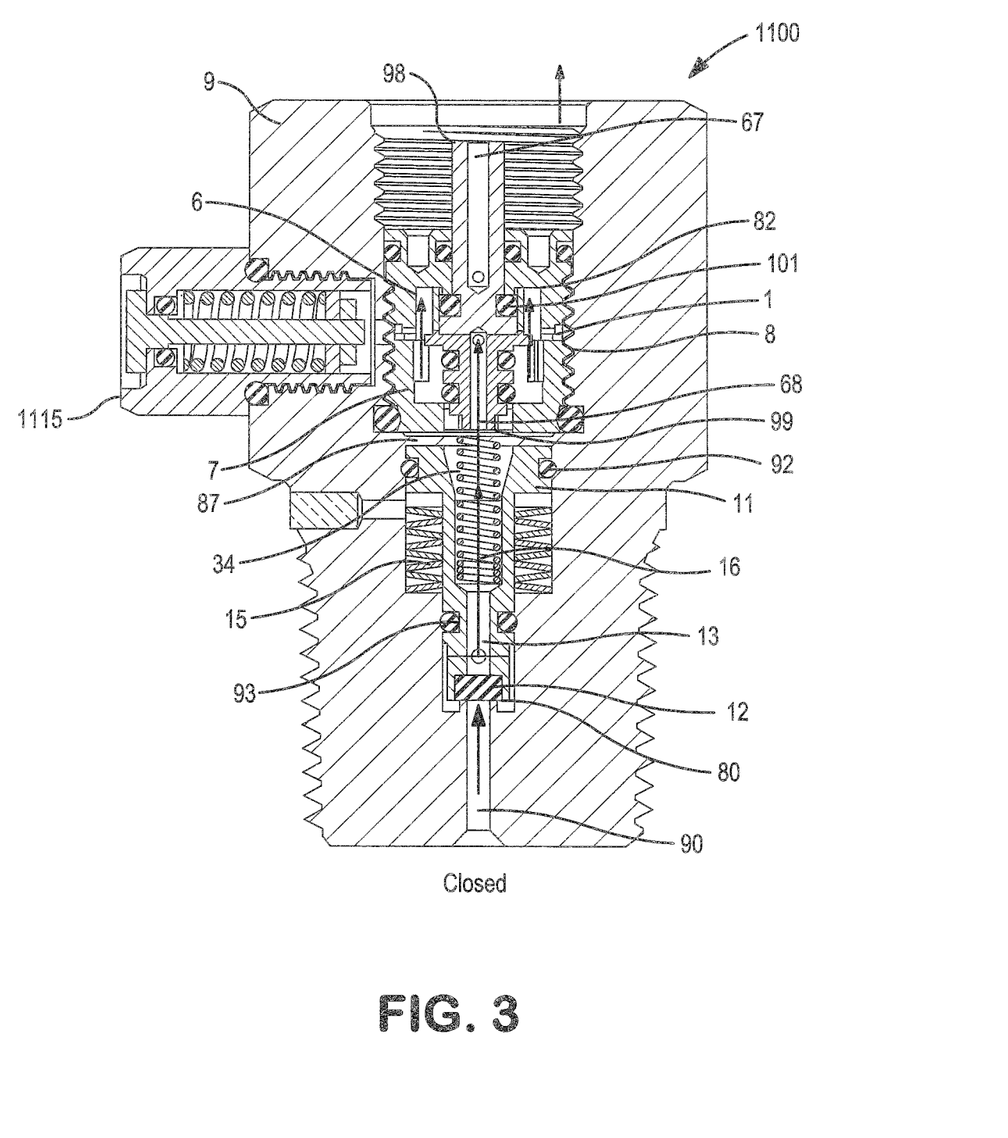
FIG. 3 shows the valve in a closed position.

FIG. 3 shows the valve 1100 in a closed position. The valve 1100 includes a valve body 9 that is substantially disposed within a top portion of the cylinder 1101 shown in FIG. 1. For purposes of clarity, the cylinder 1101 of FIG. 1 has been omitted from FIGS. 2-7 so that the structure and mechanism of valve 1100 can be properly described in sufficient detail in accordance with the principles of the present invention.

The valve body 9 comprises a plunger 1. The plunger 1 has a first end 98 and a second end 99. FIG. 3 shows the plunger 1 biased into its normal position via spring 16 (i.e., first position) and in response to not being engaged along its first end 98 by a fill adapter 600 (FIG. 6) during filling or pressure regulator during dispensing. In other words, there is no force exerted along the plunger 1 to exert or depress it further into the retainer housing 8. As such, the closed position of the plunger 1 represents the top-most position of the plunger 1 with reference to FIG. 3 (closed). In comparison, FIG. 4 (delivery mode) and FIG. 5 (fill mode) show the plunger 1 positioned below the top-most position of FIG. 3.

Still referring to FIG. 3, the plunger 1 is located in a retainer housing 8 within the valve body 9. The retainer housing 8 includes a first portion 6 and a second portion 7 located within the valve body 9, and the plunger 1 is movable within this retainer housing 8. In the closed position, the plunger 1 is biased into a sealing position whereby a non-metallic seal 101 (e.g., o-ring) of plunger 1 contacts sealing surface 82. The non-metallic seal 101 serves as the "on-off" seal. The plunger 1 further includes a first passageway 67 and a second passageway 68, both of which are characterized as hollow tubular conduits through which gas 1102 flows, which will be further described in greater detail with reference to the manner in which the gas fills and exits cylinder 1101. The second passageway 68 is spaced apart from the first passageway 67 and extends towards the second end 99 of the plunger 1.

Figure 4:
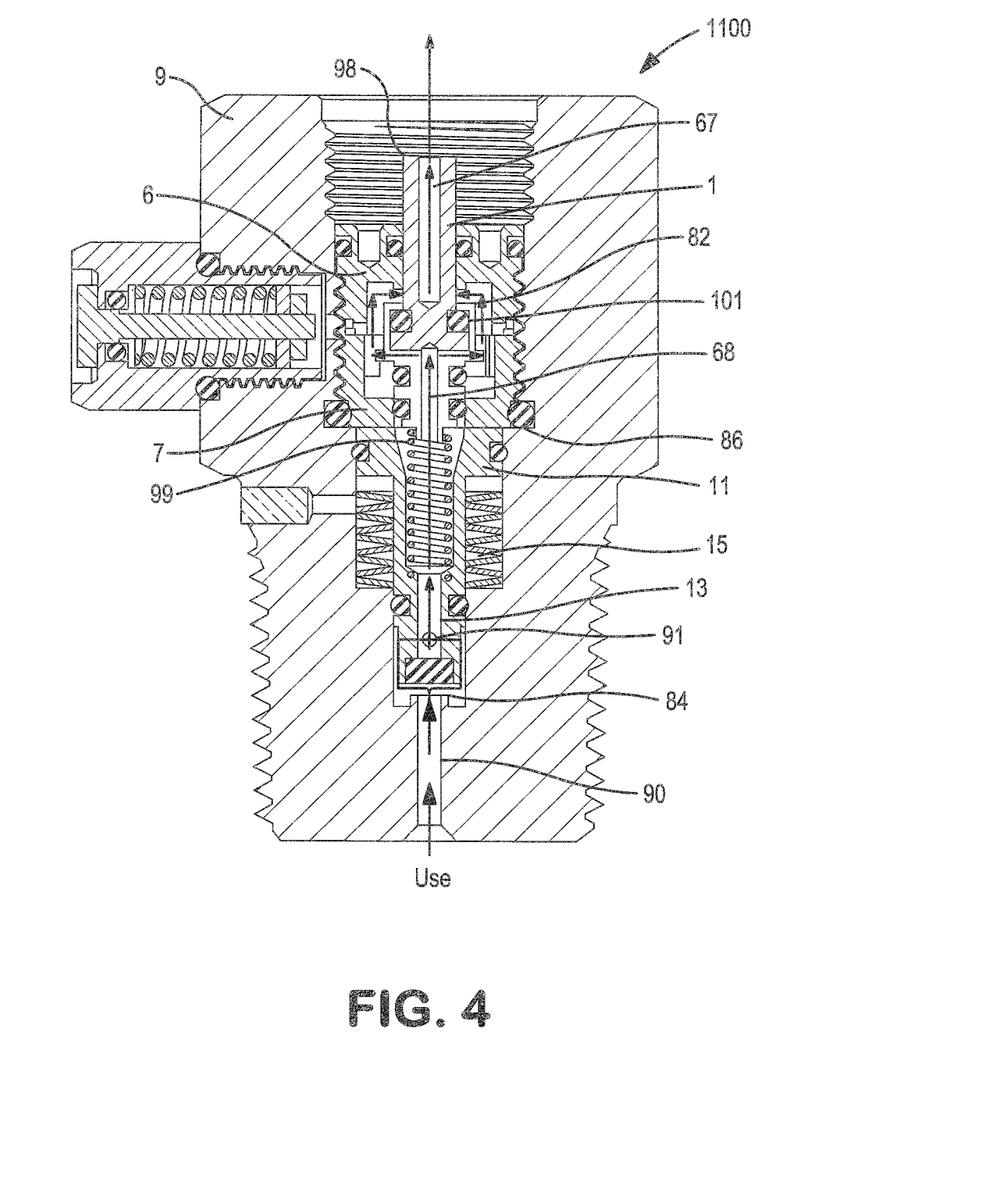
FIG. 4 shows the valve in the use or delivery position.
Figure 5:
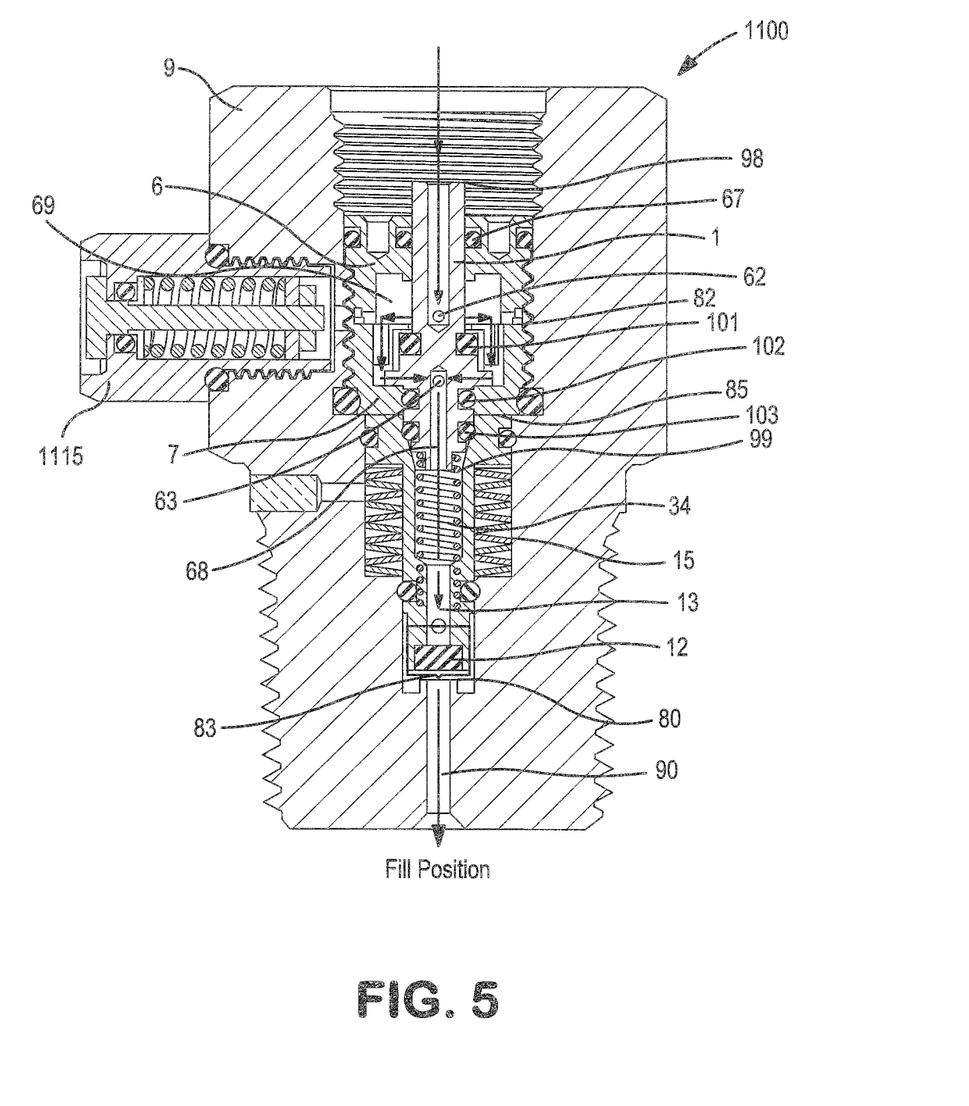
FIG. 5 shows the valve in the fill position.

A spring 16 is operably connected to the second end 99 of plunger 1. The spring 16 extends from the second end 99 of plunger 1 into a bore 34 of a piston 11, which may have a t-shaped solid structure as shown in FIGS. 3, 4 and 5. The piston 11 includes a piston first end and a piston second end. The first end of the piston 11 is operably connected to the second end 99 of the plunger 1. The second end of the piston 11 includes a hollow tubular-like stem 13 and seat 12, which is operably attached to the stem 13. Such attachment of seat 12 with stem 13 allow seat 12 and stem 13 to move together. The piston 11 contains top and bottom non-metallic seals 92 and 93, respectively (e.g., o-rings) that allow the piston 11 to seal into position with corresponding sealing surfaces along the valve housing 9. The piston 11 can slide up and down. Accordingly, the plunger 1 and piston 11 are movable in response to various forces exerted on the plunger 1 and the piston 11 by the (i) spring 16; (ii) gas 1102 within a volume defined by gap (i.e., designated as gap 87 in the closed position); and (iii) expandable diaphragm 15. The spring 16 exerts a force against the second end 99 of plunger 1. The diaphragm 15 exerts a force against the piston 11, which in turn transmits the force against the second end 99 of plunger 1.

The spring 16 exerts a force against the second end 99 of the plunger 1, in the closed position of FIG. 3. The force of diaphragm 15 is not sufficient to overcome the opposing, downward force exerted by gas 1102 that is occupying a chamber volume defined by gap 87 (as will be explained in greater detail). As a result, the seat 12 is not lifted away from its sealing surface 80, thereby preventing gas 1102 from exiting the interior of cylinder 1101 through valve conduit 90.

The closed position is further defined by the presence of gas 1102 occupying various passageways of the valve body 9, as shown in FIG. 3. Gas 1102 is contained along conduit 90 at cylinder pressure (e.g., 1800 psig). In the closed position, seat 12 prevents gas 1102 from entering cylinder 1101 and leaving cylinder 1101. In one example, when plunger 1 is in the first position (i.e., closed position of FIG. 3), the gas 1102 in gap 87 forces piston 11 and seat 12 downward to the closed position when the pressure in the gap 87 reaches a predetermined closing pressure. In one embodiment, the predetermined closing pressure is about 525 psig. In the closed position, seat 12 prevents gas 1102 stored in cylinder 1102 from leaving the cylinder 1102 at or above about 525 psig, as the upward force exerted by the diaphragm 15 is not sufficient to overcome the opposing force exerted by gas 1102 in the chamber volume defined by gap 87, and thereby lift seat 12 away from its sealing surface 80. It should be understood that the closed position can be achieved at other predetermined closing pressures, by, at least in part, setting the diaphragm 15 to exert a specific force, as will be described hereinbelow.

Gas 1102 is also shown to occupy various passageways of valve 1100, as shown in FIG. 3 by vertically oriented lines within the "white space". The gas 1102 extends within conduit 90, and those regions within the sides of seat 12;

within hollow tubular—like stem 13; within bore 34 of piston 11; within gap 87; and also within the region extending between the plunger 1 and the retainer housing 8 (including first portion 6 and second portion 7 of retainer housing 8), and up to the non-metallic seal 101 (e.g., o-ring) of plunger 1. Seal 101 (i.e., the on-off seal) contacts its sealing surface 82 in the closed position, thereby preventing flow of gas 1102 from exiting the valve body 9. It should be noted that the pressure of gas 1102 in cylinder 1101 is higher than that of the gas 1102 contained within the various passageways of valve 1100.

As used hereinbefore, herein and throughout, "gas 1102" is intended to refer to the gas within cylinder 1101; as well as gas that is filled into cylinder 1101; stored within cylinder 1101; dispensed from cylinder 1101; and gas occupying certain denoted passageways of inventive C-10 valve 1100. The pressure of such gas 1102 varies depending on whether the gas is filled into cylinder 1101; stored within cylinder 1101; dispensed from cylinder 1101; or occupying certain denoted passageways of inventive C-10 valve 1100.

The gap 87 (i.e., designated as a "third gap") is defined by the creation of a gap between the second portion 7 of retainer housing 8 and the first end of piston 11. The gap 87 creates a chamber volume. Gas 1102 occupies the chamber volume with a certain pressure that is sufficient to exert a downward force against piston 11 to cause it to move into the closed position when the pressure of gas 1102 within the gap 87 is at the predetermined closing pressure. In the closed position, the force exerted by the gas 1102 in gap 87 against piston 11 is greater than the opposing force exerted by diaphragm 15. As such, seat 12 is pushed downwards by the force of gas 1102 within the gap 87 so that seat 12 is in contact with its sealing surface 80.

The mechanism by which the valve 1100 moves from the closed position to the dispensing position (i.e., use or delivery) will now be described with reference to FIG. 3 (valve closed) and FIG. 4 (valve open for use). When gas 1102 is ready to be dispensed from the interior of cylinder 1101, an external pressure regulator (not shown) is engaged (e.g., threaded) onto the valve body 9 along the first end 98 of plunger 1 in its closed position of FIG. 3. It should be understood that a fill adapter may also be utilized to engage the first end 98 of plunger 1 for certain end-use applications. As the external pressure regulator engages onto the top portion of the valve body 9, the first end 98 of plunger 1 is pushed further into the retainer housing 8 from the first position of FIG. 3 into a second position of FIG. 4. Specifically, FIG. 4 shows both the first end 98 and second end 99 of plunger situated further into the valve body 9 as compared to FIG. 3. The plunger 1 moves into the dispensing position (i.e., a second position of FIG. 4). The dispensing position of FIG. 4 shows a newly created gap 86, which is smaller than gap 87 of the closed position in FIG. 3. It should be noted that the gap 86 does not continuously extend the entire lateral length between second end 99 of plunger 1 and piston 11, as a result of the second end 99 of plunger 1 extending into the gap 86, as shown in FIG. 4. The gap 86 serves as a pressure zone of gas 1102 that controls or regulates the delivery pressure of gas 1102 when withdrawn from the cylinder 1101. The gas 1102 occupying the volume created by the gap 86 compresses so as to exert a force in the downward direction against the piston 11 and diaphragm 15. In response, the diaphragm 15 counteracts the force of gas 1102 within the gap 86 by exerting an opposing force. As will be explained, the diaphragm 15 is constructed so that the upward force exerted by the diaphragm 15 exceeds the opposing and downward force of the gas 1102 within second gap 86, thereby lifting seat 12 off from its sealing surface 80 to create an orifice 84 (i.e., designated as a second orifice) as shown in FIG. 4. In a preferred embodiment, the diaphragm 15 is characterized by multiple spring-like washers that are stacked on top of each other so as to exert a specific force against piston 11, which in turn exerts a force against the gas 1102 in gap 86 and second end 99 of plunger 1.

The gas 1102 that is stored in the interior of cylinder 1101 exits therefrom along conduit 90 and then through the orifice 84. As the gas 1102 passes through orifice 84, it undergoes a pressure drop from cylinder pressure to a reduced and regulated pressure. In one embodiment, the gas 1102 undergoes a reduction in pressure from a cylinder pressure of about 1800-2500 psig to a reduced and regulated pressure of about 400-525 psig as it passes through orifice 84 (as indicated by the arrows in FIG. 4). It should be understood that any suitable pressure drop of gas 1102 through orifice 84 can be created by, at least in part, fabricating the diaphragm 15 in a manner to enable it to be set to exert a specific force so as to cause it to lift seat 12 away from its sealing surface 80 a certain controlled distance to create an orifice 84 of a certain controlled opening. The size of the orifice 84 can determine the pressure drop incurred by the gas 1102 as it flows across the orifice 84. The flow arrows of the gas 1102 along the single gas flow path of valve 1100 are shown in FIG. 4 to indicate the presence of gas 1102 and flow of gas 1102 that is dispensed from cylinder 1101.

The arrows along conduit 90 indicates gas 1102 existing interior of cylinder 1101 therealong at a pressure equal to about cylinder pressure. The gas 1102 passes through orifice 84 and undergoes a predetermined pressure drop. The reduced and regulated pressure of gas 1102 then flows upwards along the single gas flow path of the valve 1100 as indicated by the arrows. The reduced and regulated pressure of gas 1102 extends from seat 12, upwards along the various passageways of the single gas flow path, and eventually exits through the first tubular passageway 67 of plunger 1, located at the top of valve body 9.

The single flow gas path along which gas 1102 passes will be described in greater detail. Still referring to FIG. 4, as the gas 1102 exits the interior of the cylinder 1101 and undergoes a pressure drop from cylinder pressure to a reduced and regulated pressure when flowing through orifice 84, the gas 1102 continues to flow along the single gas flow path. Specifically, the gas 1102 flows along the substantially vertically oriented sides of regulator seat 12 (i.e., the vertical gap between the seat 12 and the valve body 9), and then enters into entry opening 91 of bore passageway 34 of stem 13. Gas 1102 flows through bore passageway 34 and then enters gap 86 (i.e., the gap created between the second portion 7 of retainer housing 8 and the first end of piston 11). Gas 1102 does not remain confined in gap 86, but, rather, the gas 1102 is free to flow into the space between the second portion 7 of retainer housing 8 and plunger 1 and then upwards into the space between the first portion 6 of retainer housing 8 and the plunger 1, as can be visually seen by the upward arrows of FIG. 4. Subsequently, the gas 1102 within the retainer housing 8 enters the opening created between seal 101 of plunger 1 and sealing surface 82. In other words, seal 101 is spaced apart from its sealing surface 82 as a result of first end 98 of plunger 1 pushed further into the retainer housing 8 from the first position of FIG. 3 into the second position of FIG. 4, in response to an external pressure regulator (not shown) engaged onto the valve body 9 and onto the first end 98 of plunger 1. The gas 1102 then enters into the first passageway 67 of plunger 1. The first passageway 67 extends to an inlet of the pressure regulator. Gas 1102 exits from first passageway 67, thereby exiting from the valve body 9 of valve 1100. It should be understood that an external pressure regulator is needed when the downstream application requires further pressure regulation to a lower pressure (e.g., 30-35 psig). However, in one embodiment, if the downstream application only requires the regulated and reduced pressure that can be created by the valve 1100 itself, as result of the gas 1102 undergoing a pressure drop from cylinder pressure when the gas 1102 flows through orifice 84 (e.g., 400-525 psig), no external pressure regulator may be required. Rather, in place of the external pressure regulator, an adapter can be engaged onto valve 1100 to push first end 98 of plunger 1 into the second (i.e., open or use) position. The adapter does not further reduce the pressure of gas 1102 exiting the valve 1100, but simply allows gas 1102 to exit valve 1100 at the pressure down-regulated by the valve 1100 itself.

During dispensing of gas 1102 as shown in FIG. 4, the expandable diaphragm 15 serves a regulating function, whereby gas 1102 from the interior of cylinder 1101 is reduced in pressure. During fabrication of the valve 1100, one or more shims (e.g., thin washer-like structures) can be added or removed to the diaphragm 15 to adjust the force it exerts during its operation, thereby setting the delivery pressure of the gas 1102 at the desired range. The diaphragm 15 is preferably composed of compressible metallic spring-like washers, but it should be understood that the diaphragm 15 can alternatively be in the form of a standard spring-like structure or other mechanical structure capable of creating a sufficient force in a single direction. In one embodiment, shims are added to the diaphragm 15 to further compress the spring-like washers of the diaphragm 15, thereby increasing the compressive force of the diaphragm 15 that it can exert against the piston 11. The increased force of the diaphragm 15 causes the gas pressure in gap 86 to be correspondingly higher, thereby enabling gas 1102 to flow past orifice 84 during use of valve 1100 at a higher and regulated delivery pressure (e.g., 400-525 psig). Conversely, one or more shims can be removed to decrease the compressive force of diaphragm in a controlled manner, which allows for a lower controlled delivery pressure of gas 1102 during use of the valve 1100. In this manner, unlike standard C-10 valves, the present invention offers the ability to fill to pressures as high as the cylinder working pressure and dispense at a reduced and regulated pressure that is suitable for an inlet of a pressure regulator having a complimentary thread to the inventive C-10 valve 1100 of ⅝"-18 UNF-2A. The pressure regulator can then further reduce the pressure of gas 1102 to that required by an end-use application, such as, by way of example, a gas calibration analyzer that requires about 30-35 psig of the gas 1102.

Gas 1102 continues to be dispensed along the single flow path in the manner described herein. When delivery of gas 1102 is completed, the pressure regulator is removed from the first end 98 of plunger 1, thereby causing the plunger 1 to revert from the second position (use) of FIG. 4 to the first position (closed) of FIG. 3. In the absence of any device engaged to the first end 98 of plunger 1, the plunger 1 is designed to be biased in its first (closed) position of FIG. 3. The transition from the use position of FIG. 4 to the closed position of FIG. 3 involves gap 86 increasing in size to re-establish gap 87. The pressure of gas in gap 87 will increase until it exerts a downward against piston 11 that exceeds the upward force of diaphragm 15, which causes seat 12 to be pushed and moved downwards until contacting its sealing surface 80. As a result, orifice 84 is eliminated.

Additionally, seal 101 of plunger 1 is abutted against its sealing surface 82, such that there is no passageway for gas 1102 to exit out of passage 67. As a result, gas 1102 remains trapped in a region spanning between sealing surface 82 and seat 12 of the single gas flow path, as indicated by the vertical lines in FIG. 3. Above seat 12, the gas 1102 can occupy a pressure equal to about the reduced and regulated pressure of gas 1102 (e.g., about 525 psig).

Figure 6:
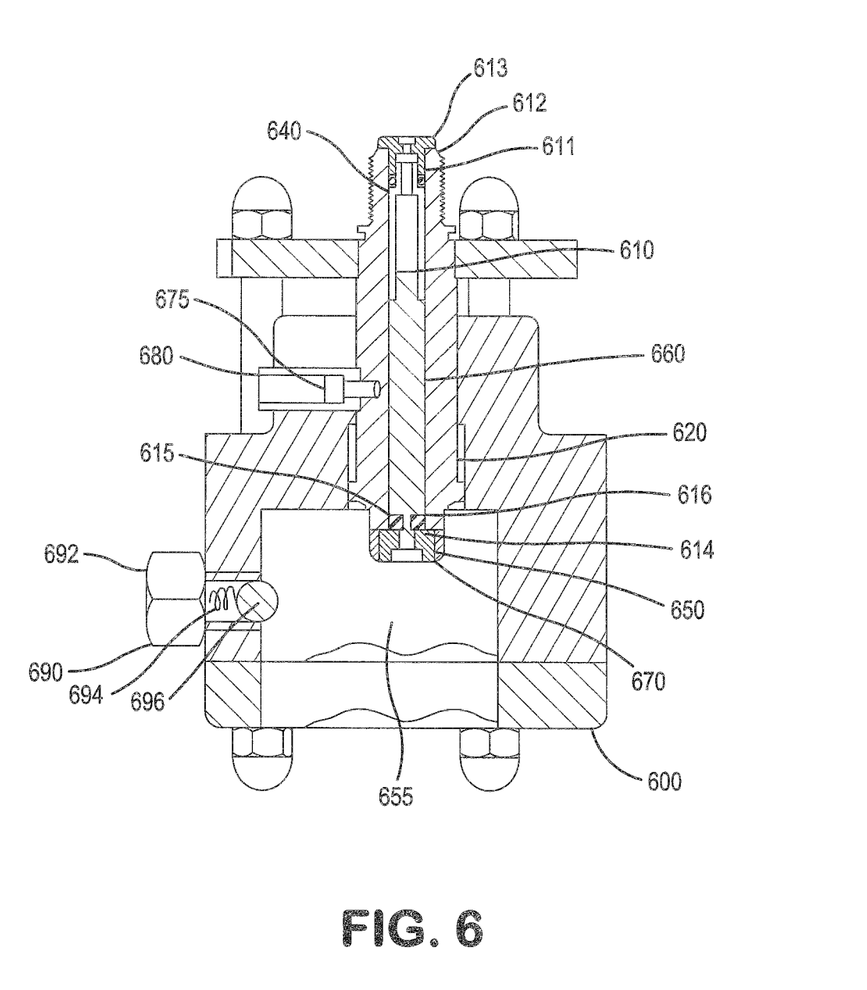
FIG. 6 shows a fill adapter.
Figure 7:
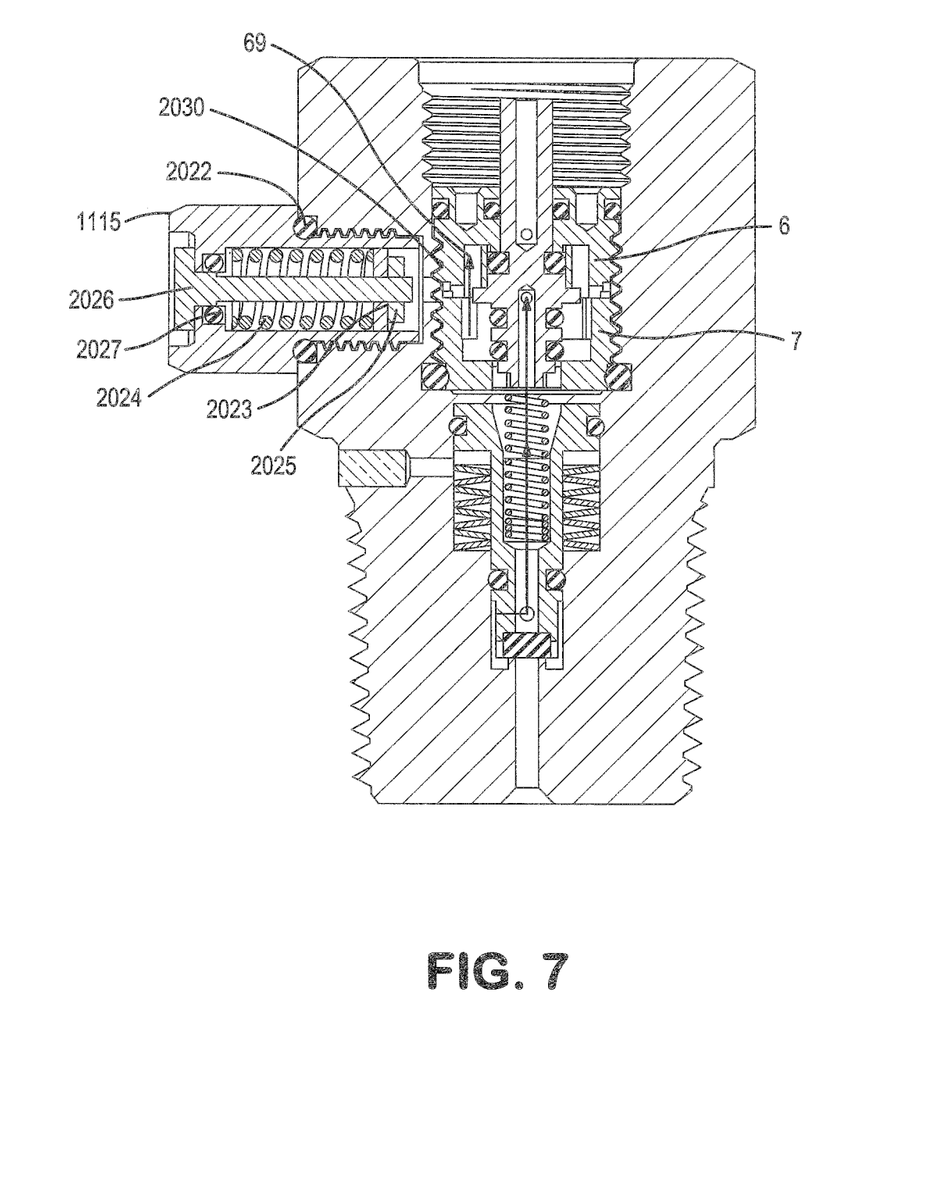
FIG. 7 shows the components of a pressure relief valve attached to the valve body of valve.

The mechanism by which the valve 1100 moves from the closed position to the fill position will now be described with reference to FIGS. 3, 5 and 6. FIG. 5 also shows the flow of gas 1102 into valve 1100 by way of arrows. When gas 1102 is ready to be filled into the interior of cylinder 1101, a fill adapter 600 (FIG. 6) is engaged onto the first end 98 of plunger 1. The fill adapter 600 extends over the pressure relief valve 1115. The fill adapter 600 includes the various components shown in FIG. 6, including o-ring 670 and lower stem 660 that contacts the first end of plunger 98. The fill adapter 600 also includes an upper stem 640 and cap assembly 613 that is threadably connected to a supply of gas 1102; a ball nose plunger 690 for engagement with pressure relief valve (hereinafter, "PRV") PRV 1115 to override the premature release of the PRV 1115 during filling; and a locking pin 680 that locks the adapter 600 onto the cylinder 1101 and valve 1100 during the filling process. In one application, the fill adapter 600 is connected to a manifold via threads located on the top of the fill adapter 600; and the cylinder 1101 and valve 1100 are inserted into the fill adapter inlet port 655. The first end of plunger 98 is engaged with the fill adapter o-ring 670 which slides over the first end 98 of plunger 1. Further, engagement of the fill adapter 600 with the cylinder 1101 and valve 1100 forces the first end 98 of plunger 1 against the fill adapter lower stem 660, thereby moving the first end 98 of plunger 1 into the fill position and allowing a seal to be made between o-rings 102 and 103 against their respective sealing surfaces, as shown in FIG. 5.

The sealing of o-rings 102 and 103 prevent gas 1102 from entering region 85 during the fill process. In the absence of o-rings 102 and 103, the gas 1102 can undesirably enter region 85 and cause the piston 11 to move downward, which would force seat 12 against its sealing surface 80 and thus prematurely block or prevent gas 1102 from entering cylinder 1101 when the pressure in region 85 exceeds the force created by diaphragm 15. Upon engagement of the lower stem 660 with the first end 98 of plunger 1, the cylinder 1101 is rotated approximately 45 degrees to allow for locking pin 680 to engage and lock into fill adapter body 600. Fill adapter 600 preferably contains a so-called "L-shaped notch" (not shown), which allows for the movement of body 600 and rotation of said body 600 into the locked position with regards to the locking pin 680. The ball nose plunger 690 of fill adapter 600 is designed to override or prevent the function of the PRV 1115 during the filling process. As will be explained, the fill adapter 600 constrains the PRV 1115 to prevent the piston 2026 of the PRV 1115 from prematurely opening during filling of gas 1102.

The third position of the plunger 1 allows filling of gas 1102 through the single gas flow path, which can be seen by the arrows of FIG. 5. Movement of plunger 1 into the third position results in the seals 102 and 103 seated against its respective sealing surfaces to prevent gas 1102 from entering gap 85. Further, seal 101 is spaced apart from its sealing surface 82 thereby allowing gas 1102 to flow into valve 1100.

The engagement of valve 1100 into the fill adapter 600 provides for a blocking of the movement of the PRV 1115. It should be noted that unlike conventional PRV's which are utilized to prevent over-pressurization of the cylinder 1101, the PRV 1115 of the present invention is designed to release pressure from valve 1100 in the event of a failure of the regulating function of the valve 1100. PRV 1115 is in fluid communication with gas 1102 in region 69 of valve 1100 via passage 2030 of FIG. 7. PRV 1115 is biased in the closed position as spring 2024 applies a force that retains stem 2026 against o-ring 2024. Gas pressure 1102 is applied to stem 2026 via passage 2030 as described above. If the force of the gas 1102 exceeds the force applied to stem 2026 by spring 2024, stem 2026 will move away from o-ring 2027 and release gas 1102 outside of the PRV 1115. Spring 2024 is retained against stem 2026 via a threaded washer 2023 and a threaded nut 2025. Alternatively, threaded nut 2025 can also be in the form of a threaded washer 2023. Use of two threaded retainers allows for a "jam" locking effect to prevent either threaded retainer from backing out from the stem. Region 69 as shown in FIG. 5 is intended to designate the region between the plunger 1 and the retainer first portion 6, in combination with the region between the plunger 1 and the retainer second portion 7. If the pressure in region 69 exceeds 650-700 psig, the PRV 1115 will open and release the excess pressure. This function is designed to protect the customer's downstream components from damage in the event of a failure of the regulating seat 12, in contrast to conventional to PRV's which prevent over pressurization of the cylinder. However, during the fill process, region 69 is exposed to gas 1102 at pressures of up to 2000 psig that are desired for filling the interior of the cylinder 1101. As such, the function of the PRV 1115 must be overridden or held in the closed position to prevent it from prematurely opening during the fill process. In this regard, during the fill process, ball 696 of the ball nose plunger 690 contacts stem 2026 of PRV 1115, shown in FIG. 7. Ball 696 is held in place with spring 694 and retaining nut 692. The spring force created by spring 694 allows for ball 696 to retain stem 2026 in its normally closed position during the fill process thereby allowing the gas pressure inside region 69 and cylinder 1101 to reach the desired fill pressure, typically 2000 psig. In this manner, the present invention enables the use of a modified and improved C-10 style valve 1100 to fill gas 1102 at higher pressures than previously attainable with conventional C-10 valves.

Having described the fill adapter 600 and its engagement onto PRV 1115 of valve 1100, the flow of gas 1102 into valve 1100 and cylinder 1101 will now be described with reference to FIGS. 5 and 6. Upon engagement of the fill adapter 600 onto valve 1100, gas 1102 will flow from a source supply (not shown), through the center of cap 613, around upper stem 640, through the center of lower stem 660 and into the single flow gas passageway of valve 1100. In particular, the gas 1102 travels downwards into the plunger first end 98 via first passageway 67, and then continues to flow through hole 62 into region 69, (as designated by the lateral arrows exiting hole 62). The gas 1102 then enters into hole 63 where it travels downward through the second tubular passageway 68 of plunger 1 and continues into stem 13, around seat 12, through orifice 83, and downwards through conduit 90 and into cylinder 1101.

Upon completion of the filling process, the source supply of gas 1102 is closed, and cylinder 1101 is rotated counterclockwise approximately 45 degrees to unlock pin 680 from its locked position and cylinder 1101 is removed from fill adapter 600. Valve spring 16 forces plunger 1 from the open position to the closed position of FIG. 3 and o-ring 101 is moved up against its respective sealing surface 82, thereby isolating gas 1102 inside the valve 1100 and cylinder 1101. Additionally, as plunger 1 moves upward, o-rings 102 and 103 move away from their seated positions thereby allowing gas 1102 to enter region 85. As gas 1102 enters region 85, it will fill this region until newly created gap 87 is re-established, which in turn pushes piston 13, with seat 12 attached thereto, downward until seat 12 contacts surface 80 thereby stopping the flow of gas 1102 from cylinder 1101 into the valve 1100.

During the process or disengagement of the valve 1100 from the fill adapter 600, a small amount of gas 1102 is vented through first end 98 of plunger 1 via first passageway 67 until o-ring 101 seats against its sealing surface 82. Also, a small amount of gas 1102 is vented through PRV 1115 upon disengagement with ball 696. Once the pressure inside region 69 drops below 650-700 psig, the PRV 1115 will close and gas 1102 will be retained inside the cylinder 1101 and valve 1100.

The fill process allows cylinder 1101 to be filled to various pressures higher than previously attainable with conventional C-10 valves. For example, in one embodiment, the cylinder 1101 can be filled to pressures of about 1800 to 2500 psig. In another embodiment, the cylinder 1101 can be filled to the working or maximum fill pressure allowable inside the cylinder 1101.

Figure 2C:
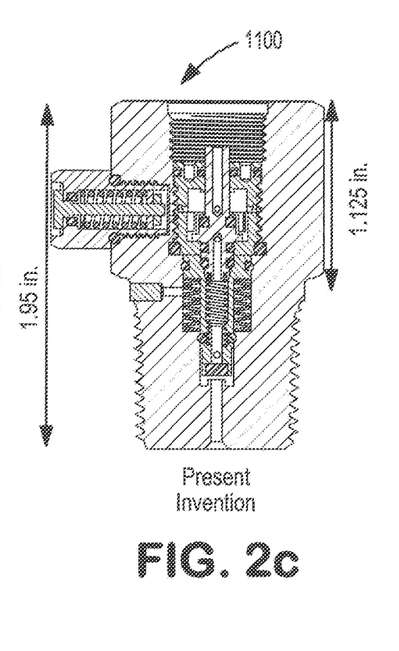

Advantageously, the inventive C-10 valve 1100 depicted in FIG. 2c shows a 55% shorter exposed height above the threads compared to the regulating C-10 valve 205 of FIG. 2b. As used herein, the exposed height refers to the portion of the valve body 9 external to the top portion of cylinder 1101. Further, valve 1100 advantageously does not have a separate fill port as required by the C-10 valve 205, which requires a separate fill port 730 of FIG. 2b. Accordingly, valve 1100 represents a significant improvement over both the standard C-10 (FIG. 2a) and the conventional regulating C-10 valve 205 (FIG. 2b).

It should be understood that the valve 1100 can be configured to regulate pressure of gas 1102 to any pressure between about 1 psig up to the fill pressure of the cylinder (e.g., 2000 psig). By way of example, the regulated pressure of the valve 1100 can range between about 10-600 psig; 25-120 psig; or 50-80 psig. The exact regulated pressure may depend on several factors, including, by way of example, customer requirements. In one example, a fill adapter with a built-in flow restrictor can be engaged to the first end 98 of plunger 1. An internal flow restrictor may be configured within the fill adapter to allow the ability to reduce flow to a controlled flow rate as may be required for the end use application. The ability for valve 1100 to regulate to such pressures may eliminate the need for an external pressure regulator. Is should also be understood that the relief pressure of PRV 1115 can be set to release gas at any pressure between 1 psig up to the fill pressure of the cylinder (e.g. 2000 psig). By way of example the PRV can have a range of 10-1000 psig; 100-800 psig; or 650-700 psig.

Other features are contemplated by the present invention. For example, a pressure gauge may be placed on the outside body of cylinder 1100. The pressure gauge is in communication with the interior of the cylinder 1101 to allow measuring the pressure of gas 1102 therewithin. In one embodiment, the pressure gauge is in communication with conduit 90 of valve 1100 to enable pressure monitoring of gas 1101 within cylinder 1101. Another example includes the use of a pressure relief device (PRD) to protect cylinder 1101 from over-pressurization. In one embodiment the PRD is in communication with conduit 90 of valve 1100 to enable pressure monitoring of gas 1101 within cylinder 1101. It should be understood that other applications for the valve 1100 are possible. For example, the valve 1100 may be used for healthcare applications, such as the delivery of medical grade oxygen or oxygen-containing mixtures. The valve 1100 may also be used for filling, storage, and delivery of nitrous oxide and helium or other gases to various end-user applications. Furthermore, it should be understood that the valve 1100 can be integrated with a cylinder 1101 having remote monitoring capabilities to detect and remotely transmit to an end-user several operating conditions of the cylinder 1101, including, by way of example, pressure of the cylinder or temperature of the cylinder.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed.

The invention claimed is:

1. A self-closing valve with a built-in regulator function and a single flow gas path, comprising:
   a valve body (9) disposed within a top portion of a gas cylinder (1101);
   the valve body (9) comprising a plunger (1) having a first end (98) and second end (99), said plunger (1) located in a retainer housing (8), said retainer housing comprising a first portion (6) and a second portion (7), said plunger (1) movable between a first position, a second position and a third position within the retainer housing, said plunger (1) comprising a first passageway (67) extending from the first end (98) of the plunger (1) and a second passageway (68) spaced apart from the first passageway (67) and extending towards the second end (99) of the plunger (1);
   a spring (16) operably connected to-the second end (99) of the plunger (1), said spring (16) extending from the second end (99) of the plunger (1) into a bore (34) of a piston (11), said spring (16) configured to exert a force against the second end (99) of the plunger (1);
   the piston (11) comprising a piston first end and a piston second end, said piston first end operably connected to the second end (99) of the plunger (1), said piston second end comprising a stem (13) and a seat (12) operably attached to the stem (13);
   an expandable diaphragm (15) within the valve body (9) and partially surrounding the piston (11), said expandable diaphragm (15) configured to exert a force against the first end of piston (11), and said expandable diaphragm (15) further configured to regulate a pressure drop from cylinder pressure to a regulated pressure as gas (1102) is dispensed from the cylinder (1101) along the single gas flow path, but not regulate the pressure drop during gas filling along the single gas flow path;
   the single gas flow path configured for gas filling into the cylinder (1101) and gas dispensing from the cylinder (1101);
   said single gas flow path for the gas filling created, at least in part, by said plunger (1) configured in the third position, said third position characterized as said plunger (1) spaced apart from a sealing surface (82) to allow the gas to enter therebetween from the first passageway (67) of the plunger (1) and thereafter into the second passageway (68) of the plunger (1), through the bore (34) and towards the stem (13) of said piston (11), said third position of the plunger (1) further characterized as said seat (12) of the piston (11) spaced apart from a sealing surface (80) to create a first orifice (83) through which the gas from the stem (13) passes into, and further wherein said first end of the piston (11) and the second portion (7) of the retainer housing (8) are spaced apart by a first gap (85)-during the gas filling; and
   said single gas flow path for the gas dispensing created, at least in part, by said plunger (1) configured into the second position, said second position characterized as said plunger (1) spaced apart from the sealing surface (82) to allow said gas to exit therethrough and into first passageway (67) of the plunger (1), said second position of the plunger (1) further characterized as said seat (12) of the piston (11) spaced apart from the sealing surface (80) to create a second orifice (84) through which gas from the cylinder passes to undergo the regulated pressure drop from cylinder pressure to a regulated pressure and thereafter said gas at said regulated pressure travels into the stem (13) and bore (34) of said piston (11), and thereafter into said second passageway (68) and said first passageway (67) of the plunger (1), said single gas flow path during dispensing further defined to have said first end of the piston (11) and the second portion (7) of the retainer housing (8) spaced apart by a second gap (86) during the gas dispensing, said second gap (86) greater than the first gap (85).

2. The self-closing valve with the built-in regulator function and the single gas flow path of claim 1, further comprising the plunger (1) biased into the first position in response to disengagement of a fill adapter (600) or pressure regulator onto the first end (98) of the plunger (1).

3. The self-closing valve with the built-in regulator function and the single gas flow path of claim 1, said first position characterized as the plunger (1) in contact with said sealing surface (82), and said seat (12) in contact with said sealing surface (80) thereby blocking a flow of said gas into and from said valve body.

4. The self-closing valve with the built-in regulator function and the single gas flow path of claim 1, such that a third gap (87) is created between the first end of the piston (11) and the second portion (7), said third gap (87) being greater than the second gap (86).

5. The self-closing valve with the built-in regulator function and the single gas flow path of claim 1, further comprising a fill adapter (600) engaged to a pressure relief valve (PRV) and said first end of the plunger (1) so as to cause the plunger (1) to move into the third position whereby said single gas flow path is configured for the gas filling.

6. The self-closing valve with the built-in regulator function and the single gas flow path of claim 1, further comprising a pressure regulator engaged to the first end of the plunger (1) so as to cause the plunger (1) to move into the second position whereby said single gas flow path is configured for the gas dispensing.

7. The self-closing valve with the built-in regulator function and the single gas flow path of claim 1, wherein the cylinder pressure is 1800-2500 psig and the regulated pressure is 400-525 psig.

8. The self-closing valve with the built-in regulator function and the single gas flow path of claim 5, wherein said fill adapter (600) prevents the PRV from opening.

9. The self-closing valve with the built-in regulator function and the single gas flow path of claim 1, wherein the plunger (1) in the third position is characterized by isolation of said first gap (85) from the regulator stem (13) and the regulator seat (12), and the regulator seat (12) spaced away from the sealing surface (80).

10. The self-closing valve with the built-in regulator function and the single gas flow path of claim 1, wherein the plunger (1) in the second position is characterized by said gas occupying a volume within said second gap at a pressure that exerts a force against the piston (11), the regulator stem (13) and the regulator seat (12) that is balanced with the opposing force of the spring (16) and the biasing member (15), thereby causing the seat (12) to be lifted off from the sealing surface (80) to create the second orifice and allow gas from inside the cylinder to pass through the second orifice and undergo the regulated pressure drop from cylinder pressure to the regulated pressure.

11. The self-closing valve with the built-in regulator function and the single gas flow path of claim 1, wherein the plunger (1) in the third position comprises the first end (98) of the plunger (1) at a location that is further situated into the retainer housing (8) of the valve body (9) in comparison to the first end (98) of the plunger (1) in the second position.

12. The self-closing valve with the built-in regulator function and the single gas flow path of claim 1, wherein said first orifice has a dimension ranging from 0.001 to 0.050 inches.

13. The self-closing valve with the built-in regulator function and the single gas flow path of claim 1, wherein said second orifice is smaller than an orifice created during fill.

14. A self-closing valve with a built-in regulator function and a single flow gas path, comprising
a valve body (9) disposed within a top portion of a gas cylinder;
the valve body (9) comprising a plunger (1) having a first end (98) and second end (99), said plunger (1) located in a retainer housing (8), said retainer housing (8) comprising a first portion (6) and a second portion (7) in the valve body (9), said plunger (1) comprising a first passageway (67) extending from the first end (98) and a second passageway (68) spaced apart from the first passageway (67) and extending towards the second end (99) of the plunger (1);
a spring (16) operably connected to the second end (99) of the plunger (1), said spring (16) extending from the second end (99) of the plunger (1) into a bore (34) of a piston (11), said spring (16) configured to exert a force against the second end (99) of the plunger (1);
the piston (11) comprising a piston first end and a piston second end, said piston first end operably connected to the second end (99) of the plunger (1), said piston second end (99) comprising a stem (13) and seat (12) operably attached thereto;
biasing member (15) within the valve body (9) and partially surrounding the piston (11), said biasing member (15) configured to exert a force against the piston first end;
said plunger (1) movable between a first position, a second position and a third position within the retainer housing (8);
the plunger (1) movable into a first position and engaged with the piston (11) in response to disengagement of a fill adapter (600) or pressure regulator from the first end (98) of the plunger (1) to create a third gap (87) between the second portion (7) and the first end of the piston (11), said plunger (1) in contact with a sealed surface (82), and said gas occupying a volume created by said third gap (87) so as to force the seat (12) into contact with sealing surface (80), thereby blocking said single flow gas path at the sealed surfaces (80) and (82);
the plunger (1) movable into a second position that is spaced apart from the sealing surface (82), said plunger (1) engaged with the piston (11) in response to engagement of a fill adapter (600) onto the first end (98) of the plunger (1) to create a second gap (86) between the second portion (7) of the retainer housing (8) and the first end of the piston (11) such that gas occupies a volume created by said second gap (86), said gas exerting a force that is balanced with the biasing member (15) in a configuration to create a second orifice (84) through which gas from the cylinder passes and can be dispensed along said single flow gas path;
the plunger (1) movable into a third position that is spaced apart from the sealing surface (82), said plunger (1) engaged with the piston (11) in response to engagement of a pressure regulator onto the first end (98) of the plunger (1) to create a first gap (85) between the second portion (7) of the retainer housing (8) and the first end of the piston (11) such that said gas occupies a volume created by said first gap (85) that is smaller than said second gap (86) and said third gap (87), wherein said spring (16) and biasing member (15) overcomes the force exerted by said gas to cause said second end (99) of plunger (1) to be in close proximity to said first end of said piston (11) that is sufficient to prevent entry of additional gas into said first gap (85), thereby bypassing said regulating function of said biasing member (15) to allow said filling of gas into cylinder.

15. The self-closing valve with the built-in regulator function and the single flow gas path of claim 14, wherein said single flow gas path during filling comprises a fluid communication between said first passageway (67), said second passageway (68), said first gap (85), said bore (34), said first orifice (83) and an interior of said cylinder.

16. The self-closing valve with the built-in regulator function and the single flow gas path of claim 14, wherein said single gas flow path during dispensing comprises a fluid communication between said first passageway (67), said second passageway (68), said second gap (86), said bore (34), said second orifice (84) and an interior of said cylinder.

17. The self-closing valve of claim 14, wherein said valve body (9) comprises an exposed height above the top portion of cylinder of no greater than 1.2 inches.

18. The self-closing valve with the built-in regulator function and the single flow gas path of claim 14, further comprising a pressure relief valve (PRV) within said valve body (9), said PRV exposed to the single flow gas path during filling at a fill pressure of up to a maximum fill pressure of 1800-3000 psig, wherein said fill adapter (600) is engaged to the first end (98) of the plunger (1) and the PRV during filling so as to prevent release/activation of the PRV.

19. The self-closing valve with the built-in regulator function and the single flow gas path of claim 14, wherein said plunger (1) comprises a first seal (101) in contact with said sealing surface (82) when said plunger is in the first position.

20. The self-closing valve with the built-in regulator function and the single flow gas path of claim 14, wherein said plunger (1) comprises a second seal (102) in contact with the second portion (7) of said retainer housing (8) to bypass said regulating function of said biasing member (15) during said filling.

* * * * *